Patented June 21, 1932

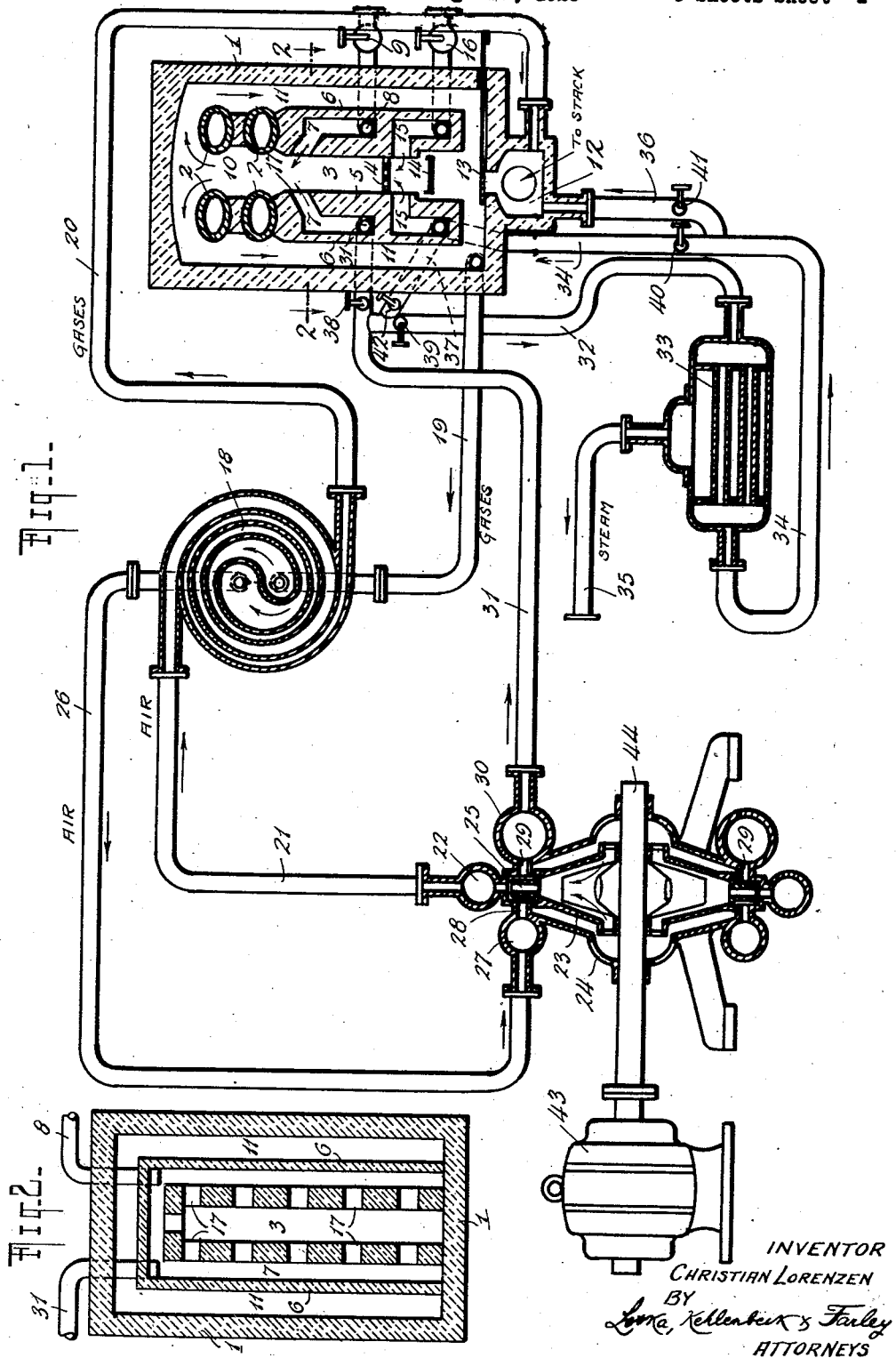

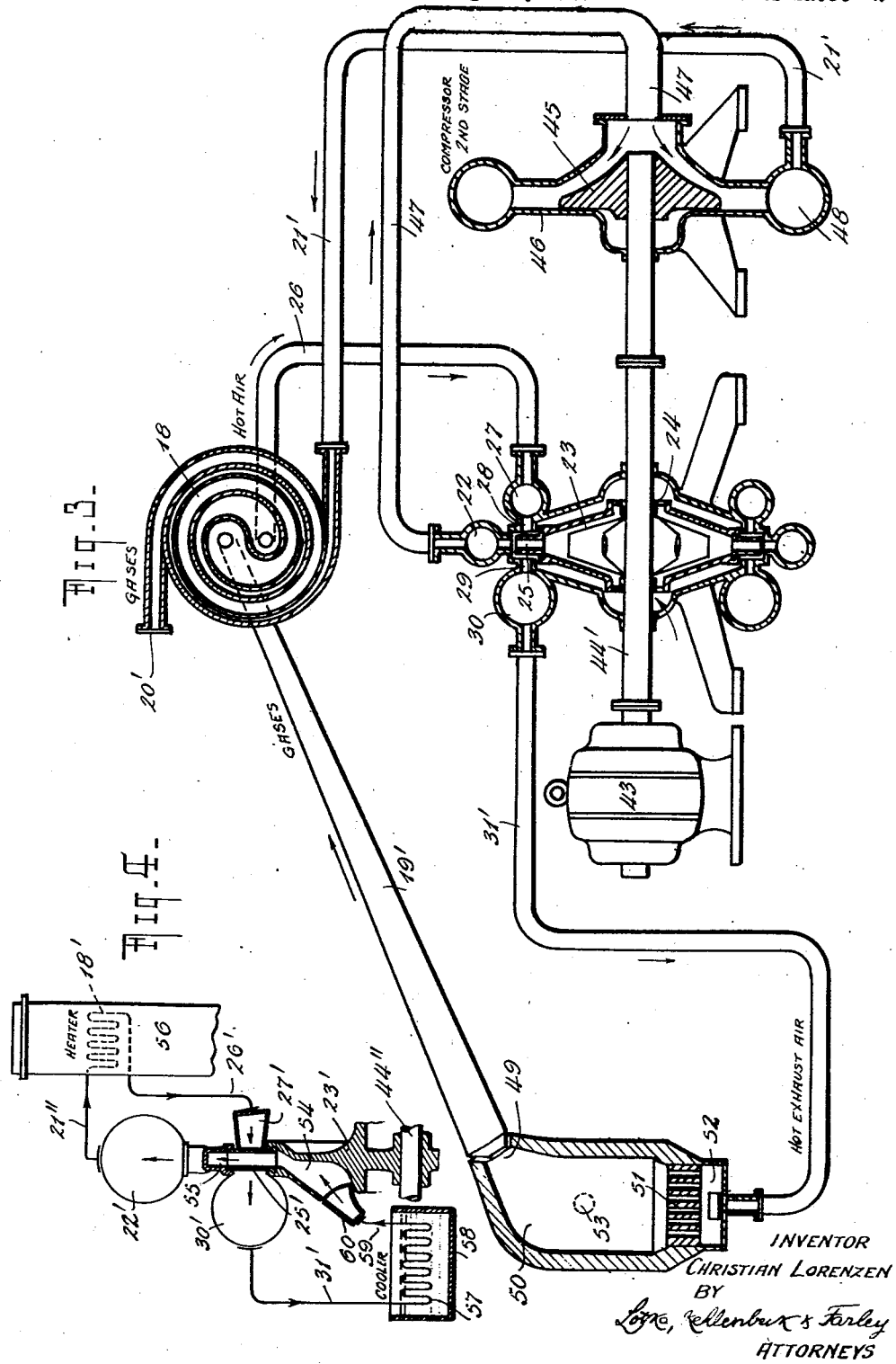

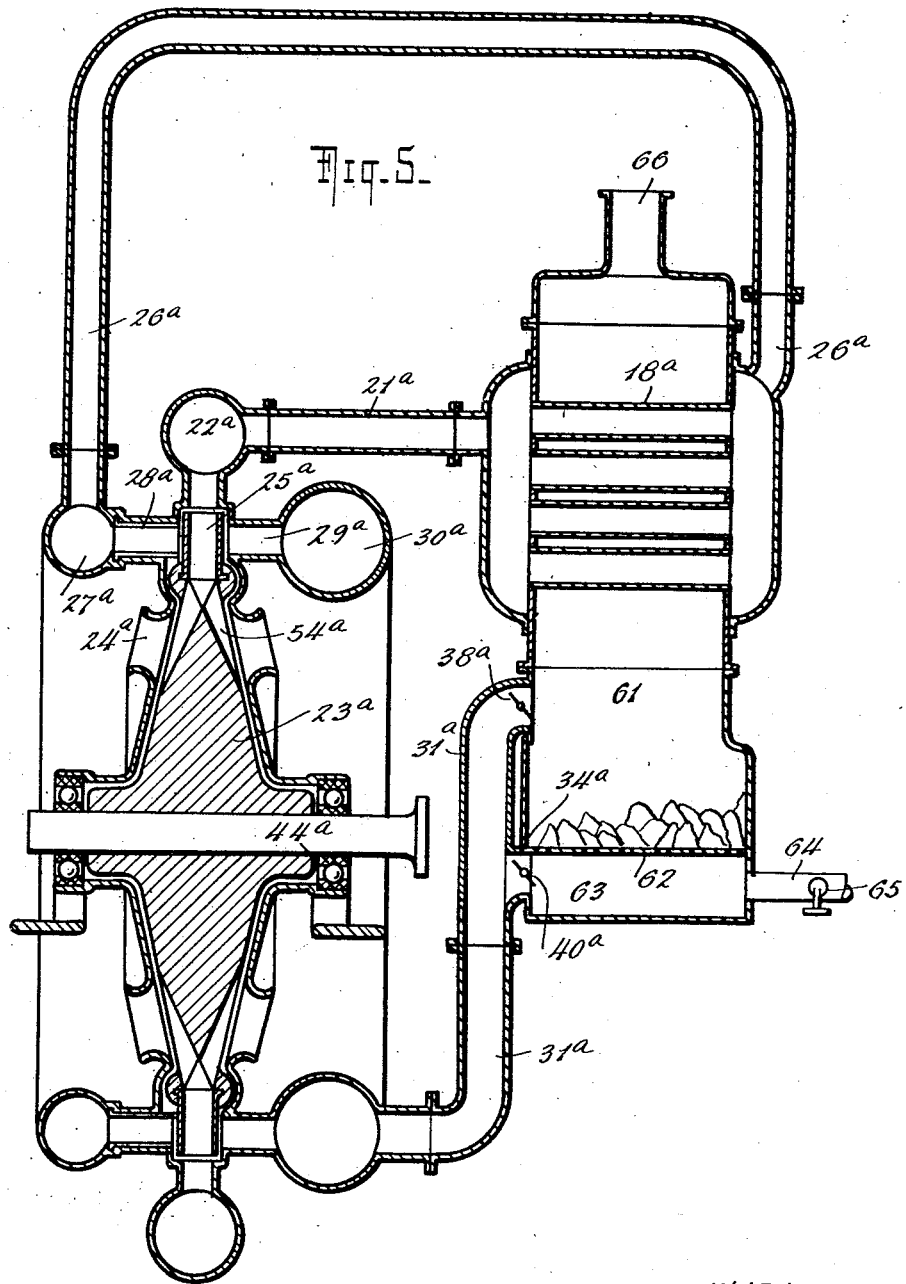

1,864,448

UNITED STATES PATENT OFFICE

CHRISTIAN LORENZEN, OF BERLIN, GERMANY, ASSIGNOR, BY MESNE ASSIGNMENTS, TO BENDIX AVIATION CORPORATION, OF CHICAGO, ILLINOIS, A CORPORATION OF DELAWARE

METHOD AND APPARATUS FOR UTILIZING WASTE HEAT

Application filed August 14, 1925. Serial No. 50,274.

When fuel is burned for the generation of steam, considerable attention is paid, as a rule, to an economic consumption of fuel. In other industrial applications, however, the utilization of the heat contents of the fuel is generally a very poor one, and a large amount of heat is wasted. This is true, for instance, with respect to gas works, foundries, blast furnaces, furnaces for melting or annealing glass, for the manufacture of ceramic ware, etc.

The object of my present invention is to utilize waste heat available in plants or furnaces of the character mentioned above, making as few changes as possible in the existing plants and their mode of operation.

In the examples illustrated by the accompanying drawings, my invention utilizes certain features disclosed in my Patent No. 1,601,402, which matured from my co-pending application Serial No. 536,562, filed in the United States Patent Office on February 14, 1922. My present application also is in part a division or continuation of my co-pending application Serial No. 666,648, filed in the United States Patent Office on October 4, 1923 which issued on February 19, 1929 as United States Patent #1,702,264.

Fig. 1 of the accompanying drawings is a diagrammatic elevation, with parts in section, showing a satisfactory way of applying my invention to gas works; Fig. 2 is a cross section on line 2—2 of Fig. 1; Fig. 3 is a similar view showing how my invention may be used in steel works, and particularly in connection with a converter; Figs. 4 and 5 show two arrangements for utilizing the waste heat of combustion gases on their way to a stack or other outlet.

In Figs. 1 and 2, the brick structure or chamber 1 contains, in its upper portion, the retorts 2 in which illuminating gas is produced in the usual manner. The retorts are heated by means of gases generated in the combustion chamber 3 from fuel (coke) burning on the grate 4. The chamber 3 is located between walls 5 which together with wall portions 6 define an air chamber 7 having an air supply connection 8 provided with a valve 9 for regulating the admission of air, or shutting it off entirely when desired. The combustion gases from the chamber 3 pass first through a chamber 10 between the retorts 2, then over said retorts, and then down in the space or chamber 11 located between the outer wall or brick structure 1 and the inner wall portions 6. At the bottom, the space 11 is adapted to communicate with a chamber 12, the connection between 11 and 12 being controlled by means of a sliding damper 13 or equivalent device operatable from the outside, as indicated. The chamber 12 communicates with the stack or other outlet (not shown). Below the grate 4 I have indicated a pan 14 adapted to contain water, to moisten the primary air which is admitted below the grate through a channel 15 controlled by a valve or equivalent device 16. The air chamber 7 has outlets 17 to the chamber 10, so that the generator gas produced in the chamber 3 is mixed with additional air and consumed to produce the proper heat in the chambers 10 and 11. Part of the heat is absorbed by the walls 5, 6 and transferred to the air flowing through the chamber 7.

At 18 I have indicated a two-path heat-exchanger or heat-transferrer of any suitable construction. One of the paths of this apparatus has an inlet connection 19 adapted to receive combustion gases from the lower portion of the chamber 11, and an outlet connection 20 leading to the chamber 12. Through an inlet connection 21, the other path of the heat transferrer receives compressed air from the stationary collector or diffusor 22 of a turbo-compressor, the rotor body of which, 23, has inlets 24 through which air reaches the inner ends of the hollow blades 25, which while rotating compress the air and project it into the collector or diffusor 22. After passing from the diffusor through the one path of the heat-transferrer 18, and absorbing heat from the hot combustion gases flowing through the other path of said transferrer, the hot compressed air is led through the outlet pipe 26 to a distributing conduit 27, the stationary nozzles 28 of which discharge such air against the outer surfaces of the blades 25 and thus actuate the rotor. The details of the turbo-compressor are not material to my present invention, and may be of the character disclosed more fully in my Patent No. 1,601,402 above referred to. The exhaust air from the turbine passes through suitable outlets 29 into a collecting channel 30 and a pipe 31 leading to the air chamber 7. A branch pipe 32 may be provided for leading a portion of the warm exhaust air to a heat-economizer 33, here shown as an apparatus having two chambers or paths through one of which such exhaust air flows to a pipe 34 leading to the channel 15. The other path or chamber of the economizer 33 is adapted to contain water, the steam generated therefrom being conducted to the place of use through a pipe 35. Of course, the heat of the air passing out through pipe 32 may be utilized in other ways than for the generation of steam. Another branch pipe 36 may connect the pipe 34 with the chamber 12, and I have also indicated a third branch pipe 37 connecting the pipe 31 with the channel 15. Suitable valves 38, 39, 40, 41, and 42 control the pipe connections 31, 32, 34, 36 and 37 respectively.

At 43 I have indicated an electric starter (motor-generator) of any approved construction, connected with the turbine shaft 44, but any other suitable starting device may be employed for starting the turbine.

At the beginning of the operation, the damper 13 is open, the valves 38, 39, 40, 41, and 42 are closed, and the valves 9, 16 are open, the turbine being stationary. The retorts 2 are filled with coal, and coke or other suitable fuel is placed on the grate 4 and ignited. Primary combustion air enters through the valve 16 and channel 15, and passes upwardly through the grate. The generator gas produced by the combustion of the fuel in the chamber 3 passes upwardly and is mixed with air admitted from the outside, through the valve 9 and air chamber 7, and issuing from the outlets 17. The combustion products pass through the chambers 10, 11, and 12 to the stack connection or other outlet. This is substantially the usual way of operating the plant for the production of illuminating gas by the distillation of the coal contained in the retorts 2. The gases escaping from the chamber 12 have a relatively high temperature, say from 450 to 600° centigrade, and in the usual procedure this heat is wasted. According to my invention, however, this heat is utilized, which is effected in the following manner with the apparatus shown in Figs. 1 and 2:

As soon as the operation has been started properly, the turbine is set in motion by means of the motor 43 or other suitable starting device. Then valve 38 is opened and damper 13 and valve 9 are closed. The combustion gases will pass from the chamber 11 through the pipe 19 and the heat-receiving path of the heat-transferrer 18 to the outlet pipe 20 and chamber 12, from which they escape to the stack or other outlet. While passing through the heat-transferrer 18, the combustion gases give up heat to the air which the action of the turbine blades 25 forces through the other path of the transferrer. Such air enters at 24, passes through the hollow blades 25, thereby cooling them and itself becoming heated to a certain degree, as well as compressed by centrifugal action. The compressed air is received by the collector or diffusor 22, from which it passes through the pipe 21 to the heat-delivering path of the transferrer 18 and thence through the pipe 26 to the distributing conduit 27 and turbine nozzles 28. The compressed air, highly heated in the transferrer 18, and correspondingly expanded, strikes the outer surfaces of the rotor blades 25 and actuates the rotor. The exhaust air, still at a relatively high temperature, passes through the outlets 29, channel 30 and pipe 31 to the place where its heat is to be utilized. For instance, with the valve 38 open, such air will pass into the chamber 7 and issue from the outlets 17. By opening the valve 42, and properly manipulating the valve 35, part or all of the exhaust air may be directed through the pipe 37 into the channels 15, to pass upwardly through the grate 4. In practice, I do not consider it advisable to send all the hot exhaust air from pipe 31 through pipe 37. Again, I may open the valve 39, thus causing the hot exhaust air (or part of it, if the valve 38 is open at the same sime) to pass through the heat-economizer or boiler 33, the steam generated therein passing out through the pipe 35 to a steam engine or other place of use, while the air, cooled by its passage through the economizer 33, but still fairly warm, is delivered either to the channels 15 (if the valve 40 is open) or to the outlet chamber 12 (if the valve 41 is open) or to both places (if both valves 40 and 41 are open). It will be understood that the flow of hot exhaust air to the chamber 7, channels 15, economizer 33 and outlet chamber 12 can be controlled by the several valves referred to above, not only for shutting off one or the other of said parts entirely from the supply of such hot air, but also to variably apportion the flow of air from the pipe 31 to two or more of the said parts. Generally speaking, the valves 9 or 16 respectively will be closed when the chamber 7 or the channels 15 respectively are receiving hot exhaust air; however, it is possible to supply at the same time to the chamber 8 or to the channels 15, both hot exhaust air and also cooler air through the valves 9 or 16 respectively, in proportions that may be regulated by a simple adjustment of the various valves. If desired, the valves 9, 16, 39 and 41 alone may be opened and the valves 38, 40, and 42 closed, so that the hot exhaust will be used exclusively for heating the boiler 33. The valves may also be manipulated in other ways to suit the user's purpose.

I desire to emphasize particularly the fact that I prefer to give the parts such proportions that the pressure of the air is not increased by the heating which such air undergoes in the heat-transferrer 18, but the pressure of the air, throughout its path, will be at its maximum in the diffuser 22, that is to say, for instance, the cross section of the passage 25 is less than that of the passage 28.

In the form of my invention illustrated by Fig. 3, the heat transferrer 18 and the connection 26 leading from its hot compressed air outlet to the distributing conduit 27 are practically the same as in Fig. 1, as are also the parts 22, 23, 24, 25, 26, 28, 29, 30 and 43, the latter being secured to the turbine shaft 44′ which, in this case, in addition to the turbine rotor 23, carries the rotor 45 of a centrifugal air compressor the stationary casing 46 of which receives warm compressed air from the diffuser 22, through a pipe 47. This compressor effects a further compression of the air, to a higher pressure, and the air thus compressed in two successive stages passes from an annular collector channel 48 of the said compressor through a pipe 21′ to the inlet of the heat-receiving path of the transferrer 18, the outlet of this path being connected with the pipe 26. The other or heat-delivering path of the transferrer 18 has its outlet at 20′ into the atmosphere or to any other suitable place (which might be a boiler such as shown at 33 in Fig. 1), the inlet of said second path being connected by a pipe 19′ with the outlet 49 of a Bessemer converter or like apparatus 50, the grate of which is indicated at 51 while 52 designates an air chamber or blast chamber located under the grate and receiving the hot air exhaust from the turbine, by way of a pipe 31′. The trunnion axis about which the converter 50 swings, is indicated at 53. During the time that hot air is being blown through the charge, the converter is in the position shown, with the outlet 49 fitted in a substantially air-tight manner against the inlet end of the pipe 19′.

In this form of my invention as well, it is not intended that the heating which the compressed air undergoes in the transferrer 18 should raise the pressure of said air; in other words, at no point of its path has the air a higher pressure than in the collector channel 48.

The element indicated at 43 in Fig. 3 has been described as a motor-generator to produce current while the turbine is delivering power. Instead of this, the element 43 may be simply a dynamo to take any surplus power delivered by the turbine, the main function of the turbine being the compression of the air which is delivered as a hot blast through the pipe 31′.

In the construction illustrated by Fig. 4, the turbine rotor 23′ mounted on the shaft 44″ has a chamber 54 extending from its central portion to the interior channels of the blades 25′, which through a stationary guide vane ring 55 of any well-known or approved construction deliver compressed air into the annular collector or diffusor 22′. The compressed air then passes through the pipe 21″ to one path of the heat transferrer 18′, which path is formed by a coil located in a stack 56 constituting the other path of the heat transferrer in this form of my invention. The compressed air thus heated by the waste heat which would otherwise escape unused, passes through the pipe 26′ to the distributing conduit 27′ provided with nozzles which discharge the driving medium against the outer faces of the blades 25′, such medium then passing through a coil 57 located in a tank 58 containing a liquid (for instance feed water) to be heated by the exhaust air. Through a pipe 59 the air thus cooled passes to a stationary annular channel 60 delivering such air to the central portion of the chamber 54. It will be seen that in this form of my invention the air circulates over and over again through the continuous closed path 54, 25′, 55, 22′, 21″, 18′, 26′, 27′, 30′, 31′, 57, 59, 60, 54. In the heat transferrer 18′, such air takes up waste heat but its pressure is not increased thereby. In this form of my invention, the waste heat taken up by the compressed air in the transferrer 18′ is utilized partly in the turbine (the energy of the flow of said air being increased by such heating) and partly in the apparatus 57, 58 which may be a feedwater heater.

Still another form of my invention is illustrated by Fig. 5. At 61 I have indicated a furnace provided with a grate 62 below which is located an air supply chamber 63. Air directly from the atmosphere or from the outlet of a blower (not shown) may be admitted through a pipe 64 controlled by a valve 65. The hot combustion gases, after passing through one path of a heat transferrer 18ª, reach the outlet 66. The furnace is used for heating a boiler or other device (not shown) which may abstract heat from the combustion gases before they reach the transferrer 18ª, so that the latter utilizes the residual or waste heat of such gases. The other path of the heat transferrer has its inlet connected by a pipe 21ª, with the collector or diffusor 22ª, while from the outlet of said path a pipe 26ª conveys the heated compressed air to the distributing conduit 27ª from the nozzles 28ª of which the driving medium is discharged against the outer surfaces of the turbine blades 25ª. Cool air, drawn in through the stationary inlets 24ª and through the chamber or channels 54ª of the rotor body 23ª mounted on the shaft 44ª, passes outwardly through the hollow blades 25ª, thus cooling the latter, and is projected in a compressed condition into the collector or diffusor 22ᵃ. The hot air which has struck the outer surfaces of the blades passes through the outlets 29ᵃ into the collecting channel 30ᵃ from which a pipe 31ᵃ and its branch 34ᵃ convey the hot blast to the furnace, either above the grate 62 or below it, or to both places, according to the position of the dampers 38ᵃ and 40ᵃ respectively.

When starting the furnace, the dampers 38ᵃ, 40ᵃ are closed, and the valve 65 opened, the turbine being inactive. When combustion is under way, the rotor of the turbine is started in any approved manner, the valve 65 closed, and damper 40ᵃ opened, damper 38ᵃ being also opened if required to secure better combustion. The turbine rotor will send compressed air through the heat transferrer 18ᵃ, and the compressed air thus heated will operate the turbine, the hot exhaust air then passing to the furnace to support combustion. Since such air is heated, combustion in the furnace will become more active than during the admission of relatively cool air through the pipe 64. The temperature will therefore also rise at the heat transferrer 18ᵃ, and the compressed air passing to the turbine through the pipe 26ᵃ will be hotter than before. Similarly, the temperature of the hot exhaust air will rise. Of course, this increase of temperature will not continue indefinitely, since a limit will soon be attained at which the losses due to radiation will prevent a further rise.

The advantages of the invention are numerous and important. In those forms of my invention where the hot exhaust air is used to support or assist combustion, the forced draft thus obtained permits the stack or chimney to be reduced in height considerably, or dispensed with altogether. In these cases, the fact that heated air is employed to support combustion, enables me to effect a material saving in fuel. In each of the constructions illustrated, the turbine will generally develop power in excess of that required for compressing and propelling the air, and this excess energy may be utilized for driving various machines or appliances, or for producing electric current, as with the aid of a dynamo such as indicated in Figs. 1 and 3. Of course, it is not necessary that all of these advantages be present in every case, and the relative importance of the several advantages may vary according to the conditions in individual cases.

Various modifications may be made without departing from the nature of my invention as set forth in the appended claims.

As has been explained above, the heating of the compressed air by the waste heat is not intended to increase the pressure of said air, but of course the resulting expansion of the air will increase the velocity of its flow and thereby the kinetic energy which is available for the performance of work.

It will also be noted that the hot exhaust fluid escaping from the turbine after performing work therein, is subsequently subjected to conditions which successively alter its temperature, first in one direction and then in the other; that is to say, the temperature is first increased (in those forms of my invention where the exhaust air is used for supporting combustion) or decreased (as in the form of my invention illustrated by Fig. 4) and subsequently decreased (in the forms illustrated by Figs. 1, 3 and 5) or increased (in the form illustrated by Fig. 4).

The term "industrial system from which waste heat is given off", as used in the claims, is intended to signify any system in which heat is used for producing some particular result and in which after the desired result has been produced the temperature of the gases or fluids used for heat purposes still remains above atmospheric temperature, and in which these gases or fluids would be exhausted and the heat contained therein dissipated to the atmosphere, unless some special provision is made for using this heat for producing work and for saving the energy contained therein. By the term "waste heat" is intended the heat of such exhaust gases or fluids or other heat which is not utilized in performing the primary function of the apparatus and which is no longer useful for that purpose, but which, on account of its temperature, still contains sufficient energy to do some work of a type independent of the primary function of the apparatus.

I claim:

1. Method of treating a gas which consists in compressing the gas, transferring thereto waste heat, compressing and simultaneously heating additional gas by the energy of said heated gas, and thereafter using said heated gas for heating.

2. Method of utilizing waste heat which comprises compressing a fluid and simultaneously heating said fluid by the fluid by which the fluid to be heated is compressed, further heating said compressed fluid by said waste heat, using said heated, compressed fluid for heating and compressing further fluid and for simultaneously doing other work, and using the remaining heat in said heated and compressed fluid.

3. Method of utilizing waste heat which comprises compressing a fluid and simultaneously heating said fluid by the fluid by which the fluid to be heated is compressed, further heating said compressed fluid by said waste heat, using said heated, compressed fluid for heating and compressing further fluid and for simultaneously doing other work, and using said heated and compressed fluid for aiding the combustion from which said waste heat issues.

4. Method of utilizing waste heat contained in combustion gases which comprises compressing a fluid and simultaneously heating said fluid by the fluid by which it is compressed, further heating said compressed fluid by the waste heat of said combustion gases, using said heated and compressed fluid for heating and compressing other fluid and for doing other work, and thereafter using said heated and compressed fluid for aiding the combustion which produces said gases.

5. An industrial system from which waste heat is given off, and means for utilizing said waste heat comprising a two path heat exchanger, one path of said heat exchanger being adapted to receive said waste heat from said industrial system, a fluid compressor, the other path of said heat exchanger being connected to the outlet of said compressor, said compressor being driven by the gases from said second path, and a connection from said second path whereby fluid used in driving said compressor passes to the industrial system to aid combustion therein.

6. An industrial system from which waste heat is given off, and means for utilizing said waste heat comprising a fluid compressor, means for heating the fluid emitted from said compressor by said waste heat, means for driving said compressor by said heated fluid, and means for using said fluid in said system.

7. An industrial system from which waste heat is given off, and means for utilizing said waste heat comprising a fluid compressor, means for heating the fluid emitted from said compressor by said waste heat, means for driving said compressor by said heated fluid, and means for using said fluid to aid combustion in said system.

8. An industrial plant from which waste heat is given off in the exhaust gases of combustion, and means for utilizing said waste heat comprising a two path heat exchanger, said exhaust gases flowing through one path of said heat exchanger, a fluid compressor, the fluid acted on by said compressor passing through the second path of said heat exchanger, said heated and compressed fluid being adapted to operate said compressor and simultaneously to heat the fluid being compressed, and means for thereafter using said heated and compressed fluid for aiding in the combustion in said system.

In testimony whereof I have hereunto set my hand.

CHRISTIAN LORENZEN.